(12) United States Patent
Maguire et al.

(10) Patent No.: US 11,987,112 B2
(45) Date of Patent: May 21, 2024

(54) BATTERY PACK ENCLOSURE HAVING A SECTIONED SIDEWALL

(71) Applicant: Ford Global Technologies, LLC, Dearborn, MI (US)

(72) Inventors: Patrick Daniel Maguire, Ann Arbor, MI (US); Vladimir Vladimirovich Bogachuk, West Bloomfield, MI (US); Robert Reiners, Ypsilanti, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 220 days.

(21) Appl. No.: 17/550,128

(22) Filed: Dec. 14, 2021

(65) Prior Publication Data
US 2023/0182556 A1 Jun. 15, 2023

(51) Int. Cl.
*B60K 1/04* (2019.01)
*B60L 50/60* (2019.01)
*H01M 50/209* (2021.01)
*H01M 50/244* (2021.01)
*H01M 50/262* (2021.01)

(52) U.S. Cl.
CPC .............. *B60K 1/04* (2013.01); *B60L 50/66* (2019.02); *H01M 50/209* (2021.01); *H01M 50/244* (2021.01); *H01M 50/262* (2021.01); *B60K 2001/0438* (2013.01); *H01M 2220/20* (2013.01)

(58) Field of Classification Search
CPC ............. H01M 50/209; H01M 50/244; H01M 50/262; H01M 50/264; H01M 2220/20; B60K 1/04; B60L 50/64; B60L 50/66
See application file for complete search history.

(56) References Cited

U.S. PATENT DOCUMENTS

| | | | |
|---|---|---|---|
| 9,985,258 B2 | 5/2018 | Hara et al. | |
| 10,629,874 B2* | 4/2020 | Lee ..................... | H01M 50/204 |
| 11,063,316 B2 | 7/2021 | Kim et al. | |
| 2020/0052252 A1 | 2/2020 | Smith et al. | |
| 2020/0148066 A1* | 5/2020 | Sekar .................. | H01M 50/262 |
| 2020/0212389 A1* | 7/2020 | Kuroiwa ............. | H01M 50/282 |
| 2021/0083239 A1 | 3/2021 | Popovski et al. | |
| 2021/0184192 A1 | 6/2021 | White et al. | |

* cited by examiner

*Primary Examiner* — Jason D Shanske
*Assistant Examiner* — James J Triggs
(74) *Attorney, Agent, or Firm* — David B. Kelley; Carlson, Gaskey & Olds, P.C.

(57) ABSTRACT

A battery pack includes an upper sidewall section of an enclosure, a lower sidewall section of the enclosure, and a fastener that moves to a secured position to secure the upper sidewall section to the lower sidewall section. The fastener is configured to be moved to the secured position from within an interior area of the enclosure. The battery pack further includes a gasket seal held between the upper sidewall section and the lower sidewall section at a position outside the fastener relative to an interior area of the enclosure.

19 Claims, 4 Drawing Sheets

BATTERY PACK ENCLOSURE HAVING A SECTIONED SIDEWALL

TECHNICAL FIELD

This disclosure relates generally to a traction battery enclosure and, more particularly to an enclosure wall that includes multiple sections.

BACKGROUND

Electrified vehicles differ from conventional motor vehicles because electrified vehicles are selectively driven using one or more electric machines powered by a traction battery. The electric machines can drive the electrified vehicles instead of, or in addition to, an internal combustion engine. Example electrified vehicles include hybrid electric vehicles (HEVs), plug-in hybrid electric vehicles (PHEVs), fuel cell vehicles (FCVs), and battery electric vehicles (BEVs).

The traction battery of electrified vehicles can include an enclosure for housing the battery arrays. The enclosure can include multiple pieces that are secured together.

SUMMARY

In some aspects, the techniques described herein relate to a battery assembly for an electrified vehicle, including: an upper sidewall section of an enclosure; a lower sidewall section of the enclosure; a fastener that moves to a secured position to secure the upper sidewall section to the lower sidewall section, the fastener configured to be moved to the secured position from within an interior area of the enclosure; and a seal held between the upper sidewall section and the lower sidewall section at a position outside the fastener relative to an interior area of the enclosure.

In some aspects, the techniques described herein relate to an assembly, wherein the upper sidewall section is an extruded upper sidewall section and the lower sidewall section is an extruded lower sidewall section.

In some aspects, the techniques described herein relate to an assembly, further including at least one array of battery cells disposed within the interior area.

In some aspects, the techniques described herein relate to an assembly, wherein an outwardly facing surface of the upper sidewall section is planar, and an outwardly facing surface of the lower sidewall section is planar.

In some aspects, the techniques described herein relate to an assembly, wherein the outwardly facing surfaces of the upper sidewall section and the lower sidewall section are coplanar.

In some aspects, the techniques described herein relate to an assembly, wherein an outwardly facing surface of the upper sidewall section is flangeless and an outwardly facing surface of the lower sidewall section is flangeless.

In some aspects, the techniques described herein relate to an assembly, wherein an outwardly facing surface of the upper sidewall section and an outwardly facing surface of the lower sidewall section face a frame member of an electrified vehicle.

In some aspects, the techniques described herein relate to an assembly, wherein the upper sidewall section rests on an upwardly facing surface of the lower sidewall section when the upper sidewall section is secured to the lower sidewall section.

In some aspects, the techniques described herein relate to an assembly, wherein the upper sidewall section includes an attachment flange projecting toward the interior area, the fastener extending through an aperture in the attachment flange to secure the upper sidewall section to the lower sidewall section.

In some aspects, the techniques described herein relate to an assembly, wherein the upper sidewall section includes an attachment flange projecting toward the interior area from a primary section of the upper sidewall section.

In some aspects, the techniques described herein relate to an assembly, wherein a thickness of a primary section of the upper sidewall section is less than a thickness of a primary section of the lower sidewall section.

In some aspects, the techniques described herein relate to an assembly, wherein the fastener extends through an aperture in the attachment flange to engage the lower sidewall section when the upper sidewall section is secured to the lower sidewall section.

In some aspects, the techniques described herein relate to an assembly, wherein the fastener threadably engages the lower sidewall section.

In some aspects, the techniques described herein relate to an assembly, further including an upper tier crossmember that extends outboard over at least a portion of lower sidewall section.

In some aspects, the techniques described herein relate to an assembly, further including a lower tier crossmember, wherein a longitudinal length of the upper tier crossmember is greater than a longitudinal length of the lower tier crossmember.

In some aspects, the techniques described herein relate to an assembly, further including a lid secured directly to the upper sidewall section and a tray secured directly to the lower sidewall section.

In some aspects, the techniques described herein relate to an assembly, wherein the lid spans from the upper sidewall section to another upper sidewall section on an opposing side of the enclosure, wherein tray spans from the lower sidewall section to another lower sidewall section on an opposite, second side of the enclosure.

In some aspects, the techniques described herein relate to an enclosure securing method, including: from an interior area of a battery pack enclosure, moving a fastener to a secured position; securing an upper sidewall section to a lower sidewall section using the fastener in the secured position; and sealing an interface between the upper sidewall section and the lower sidewall section at a position that is outside the fastener relative to the interior area.

In some aspects, the techniques described herein relate to an enclosure securing method, wherein an outwardly facing surface of the upper sidewall section is planar, and outwardly facing surface of the lower sidewall section is planar.

The embodiments, examples and alternatives of the preceding paragraphs, the claims, or the following description and drawings, including any of their various aspects or respective individual features, may be taken independently or in any combination. Features described in connection with one embodiment are applicable to all embodiments, unless such features are incompatible.

BRIEF DESCRIPTION OF THE FIGURES

The various features and advantages of the disclosed examples will become apparent to those skilled in the art from the detailed description. The figures that accompany the detailed description can be briefly described as follows.

DETAILED DESCRIPTION

This disclosure relates generally to a traction battery pack enclosure. Sidewalls of the enclosure are sectioned. The sections of the sidewall be stacked atop one another.

Figure 1:
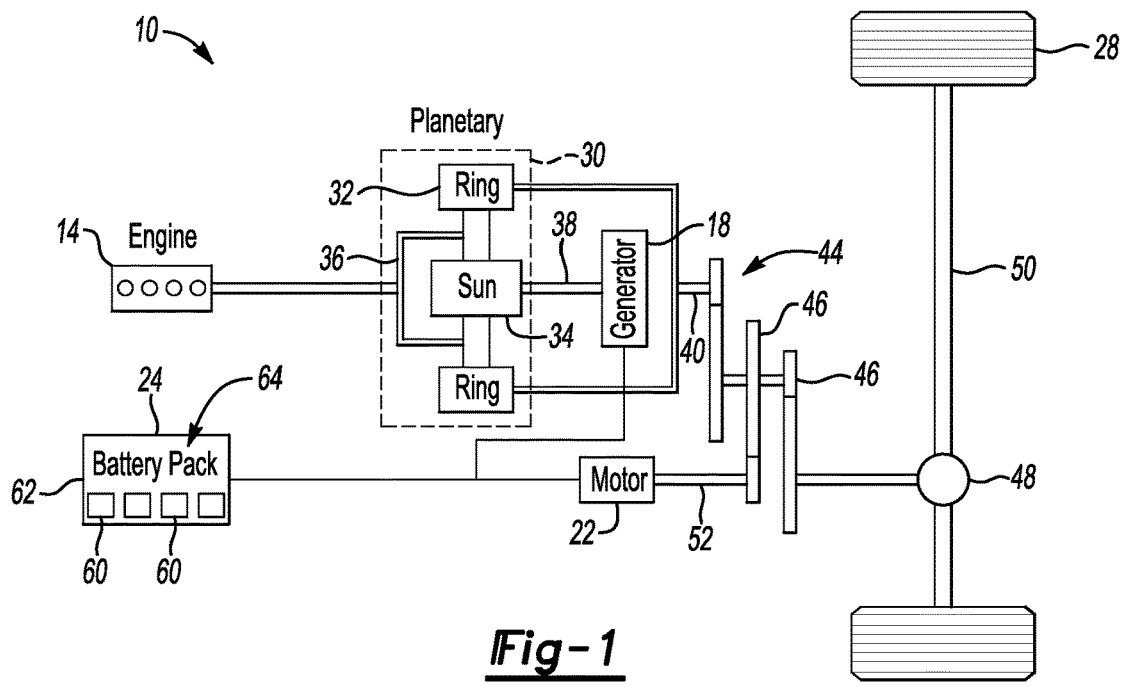
FIG. 1 illustrates a schematic view of a powertrain for an electrified vehicle.

FIG. 1 schematically illustrates a powertrain 10 for an electrified vehicle. Although depicted as a hybrid electrified vehicle (HEV), it should be understood that the concepts described herein are not limited to HEVs and could extend to other electrified vehicles, including, but not limited to, plug-in hybrid electrified vehicles (PHEVs), fuel cell vehicles, and battery electrified vehicles (BEVs).

In one embodiment, the powertrain 10 is a powersplit powertrain system that employs a first drive system and a second drive system. The first drive system includes a combination of an engine 14 and a generator 18 (i.e., a first electric machine). The second drive system includes at least a motor 22 (i.e., a second electric machine), the generator 18, and a battery pack 24. In this example, the second drive system is considered an electric drive system of the powertrain 10. The first and second drive systems generate torque to drive one or more sets of vehicle drive wheels 28 of the electrified vehicle.

The engine 14, which is an internal combustion engine in this example, and the generator 18 may be connected through a power transfer unit 30. In one non-limiting embodiment, the power transfer unit 30 is a planetary gear set that includes a ring gear 32, a sun gear 34, and a carrier assembly 36. Of course, other types of power transfer units, including other gear sets and transmissions, may be used to connect the engine 14 to the generator 18.

The generator 18 can be driven by engine 14 through the power transfer unit 30 to convert kinetic energy to electrical energy. The generator 18 can alternatively function as a motor to convert electrical energy into kinetic energy, thereby outputting torque to a shaft 38 connected to the power transfer unit 30. Because the generator 18 is operatively connected to the engine 14, the speed of the engine 14 can be controlled by the generator 18.

The ring gear 32 of the power transfer unit 30 may be connected to a shaft 40, which is connected to vehicle drive wheels 28 through a second power transfer unit 44. The second power transfer unit 44 may include a gear set having a plurality of gears 46. Other power transfer units may also be suitable. The gears 46 transfer torque from the engine 14 to a differential 48 to ultimately provide traction to the vehicle drive wheels 28. The differential 48 may include a plurality of gears that enable the transfer of torque to the vehicle drive wheels 28. In this example, the second power transfer unit 44 is mechanically coupled to an axle 50 through the differential 48 to distribute torque to the vehicle drive wheels 28.

The motor 22 (i.e., the second electric machine) can also be employed to drive the vehicle drive wheels 28 by outputting torque to a shaft 52 that is also connected to the second power transfer unit 44. In one embodiment, the motor 22 and the generator 18 cooperate as part of a regenerative braking system in which both the motor 22 and the generator 18 can be employed as motors to output torque. For example, the motor 22 and the generator 18 can each output electrical power to the battery pack 24.

The battery pack 24 is an example type of electrified vehicle assembly. The battery pack 24 is a high-voltage battery that is capable of outputting electrical power to operate the motor 22 and the generator 18. Other types of energy storage devices and/or output devices can also be used with the electrified vehicle having the powertrain 10.

The battery pack 24 is a traction battery pack as the battery pack 24 can provide power to propel the wheels 28. The battery pack 24 can include a plurality of battery arrays 60 that each include a plurality of individual battery cells. An enclosure assembly 62 of the battery pack 24 provides an interior area 64. The battery arrays 60 are disposed within the interior area. The battery pack 24 can be secured to an underbody of an electrified vehicle between frame members of the electrified vehicle.

Figure 2:
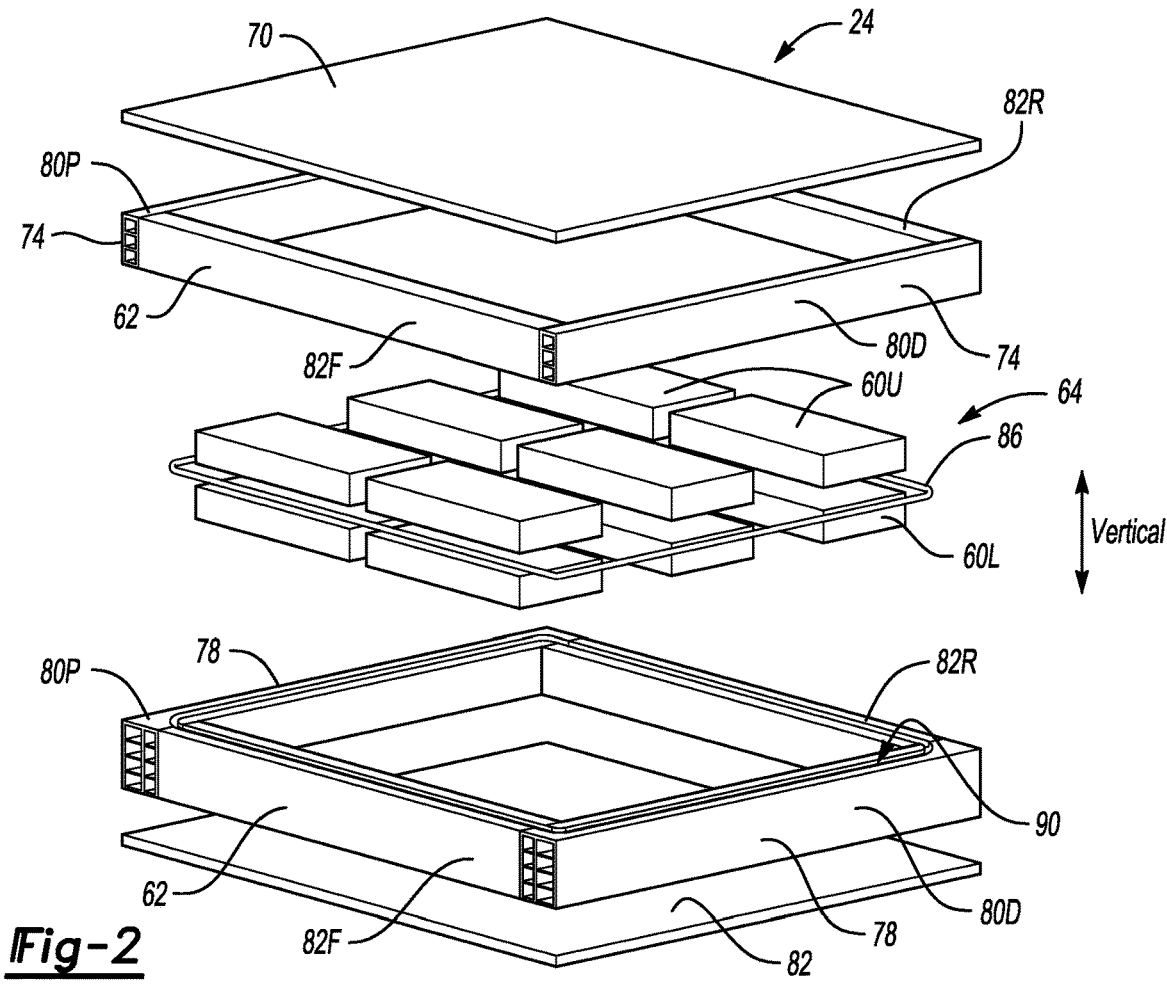
FIG. 2 illustrates an expanded view of selected portions of a battery pack from the powertrain of FIG. 1.

With reference now to FIG. 2, the example enclosure assembly 62 includes a lid 70, upper sidewall sections 74, lower sidewall sections 78, and a tray 82. When the enclosure assembly 62 is assembled, the upper sidewall sections 74 are stacked atop respective lower sidewall sections 78 such that the upper sidewall sections 74 each rest vertically atop a respective one of the lower sidewall sections 78. One of the upper sidewall sections 74 and one of the lower sidewall sections 78 combine to provide a passenger side wall 80P of the enclosure assembly 62. One of the upper sidewall sections 74 and one of the lower sidewall sections 78 combine to provide a driver side wall 80D of the enclosure assembly 62. In the exemplary embodiment, a front wall assembly 82F and a rear wall assembly 82D provide respective front and rear sides of the enclosure assembly 62.

The example enclosure assembly 62 hold a plurality of the battery tiers 60L on a first, lower tier, and a plurality of the battery tiers 60U on a second, upper tier that is vertically above the first tier. Vertical, for purposes of this disclosure, is with reference to ground and an ordinary orientation of the battery pack 24 during operation of the electrified vehicle having the powertrain 10. Other example enclosure assemblies hold only a single tier of battery arrays or more than two tiers of battery arrays.

The enclosure assembly 62 includes a seal 86 that extends circumferentially continuously about a periphery of the interior area 64. The seal 86 is held between the upper sidewall sections 74 and the lower sidewall sections 78. The seal 86 is a press-in-place seal in this example.

Generally, areas outside of the seal 86 relative to the interior area 64 can include moisture and can be considered wet areas. Areas inside the seal 86 relative to the interior area 64 can be considered dry areas. The seal 86 helps to block moisture and contaminates from moving to and from the interior area 64 from outside the battery pack 24.

Areas of the seal 86 extending between the upper sidewall sections 74 and the lower sidewall sections 78 are held within a groove 90 provided by the lower sidewall sections 78. The upper sidewall sections 74 and the lower sidewall sections 78 can be extruded and can be a metal or metal alloy. The groove 90 can be machined into the lower sidewall sections 78 after the lower sidewall sections 78 are extruded. In other examples, the groove 90 is extruded into the profile.

A person having skill in this art and the benefit of this disclosure would be able to structurally distinguish a component that is extruded from a component that is not extruded. Thus, specifying that an example sidewall sections are extruded components helps to structurally distinguish that component.

Figure 3:
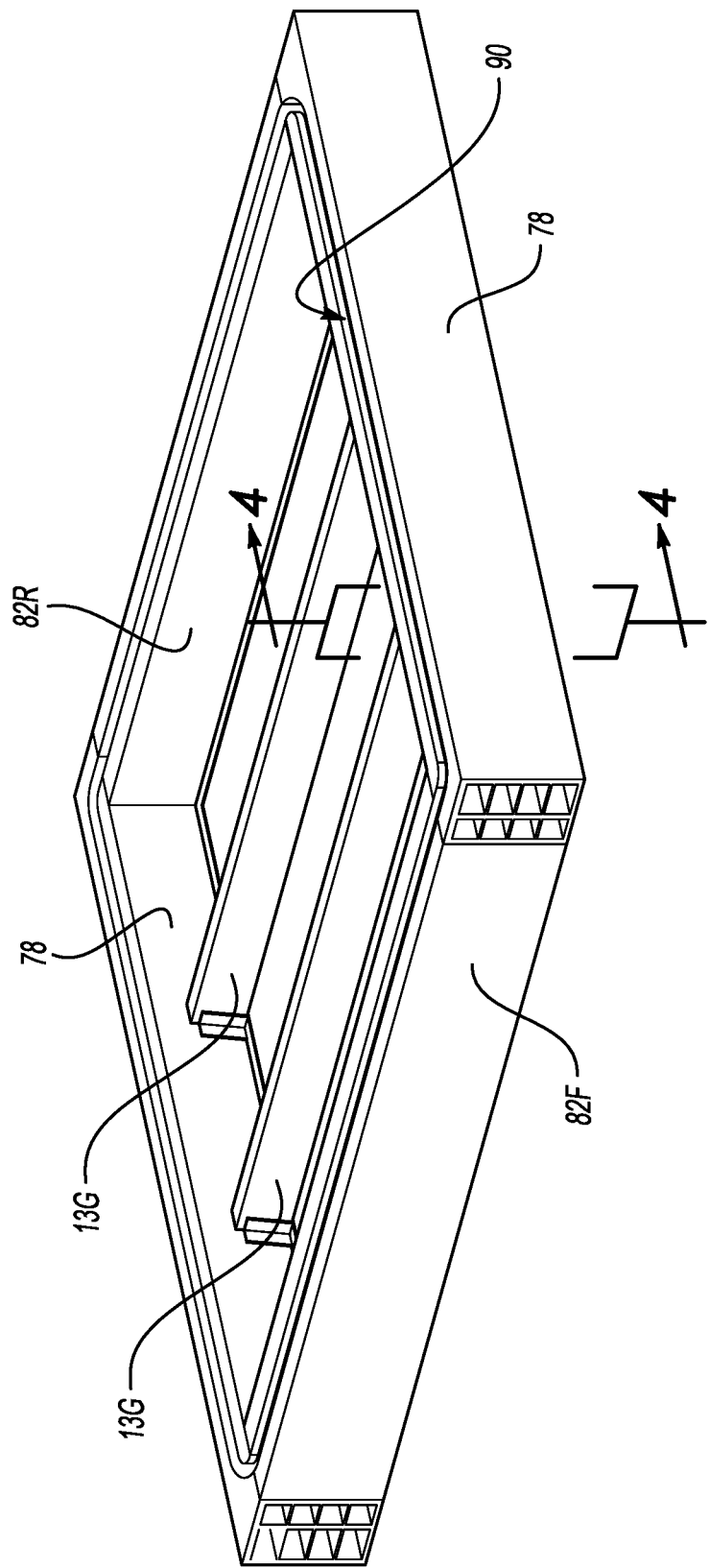
FIG. 3 illustrates lower sidewall sections and crossmembers from a lower tier of the battery pack of FIG. 2.
Figure 4:
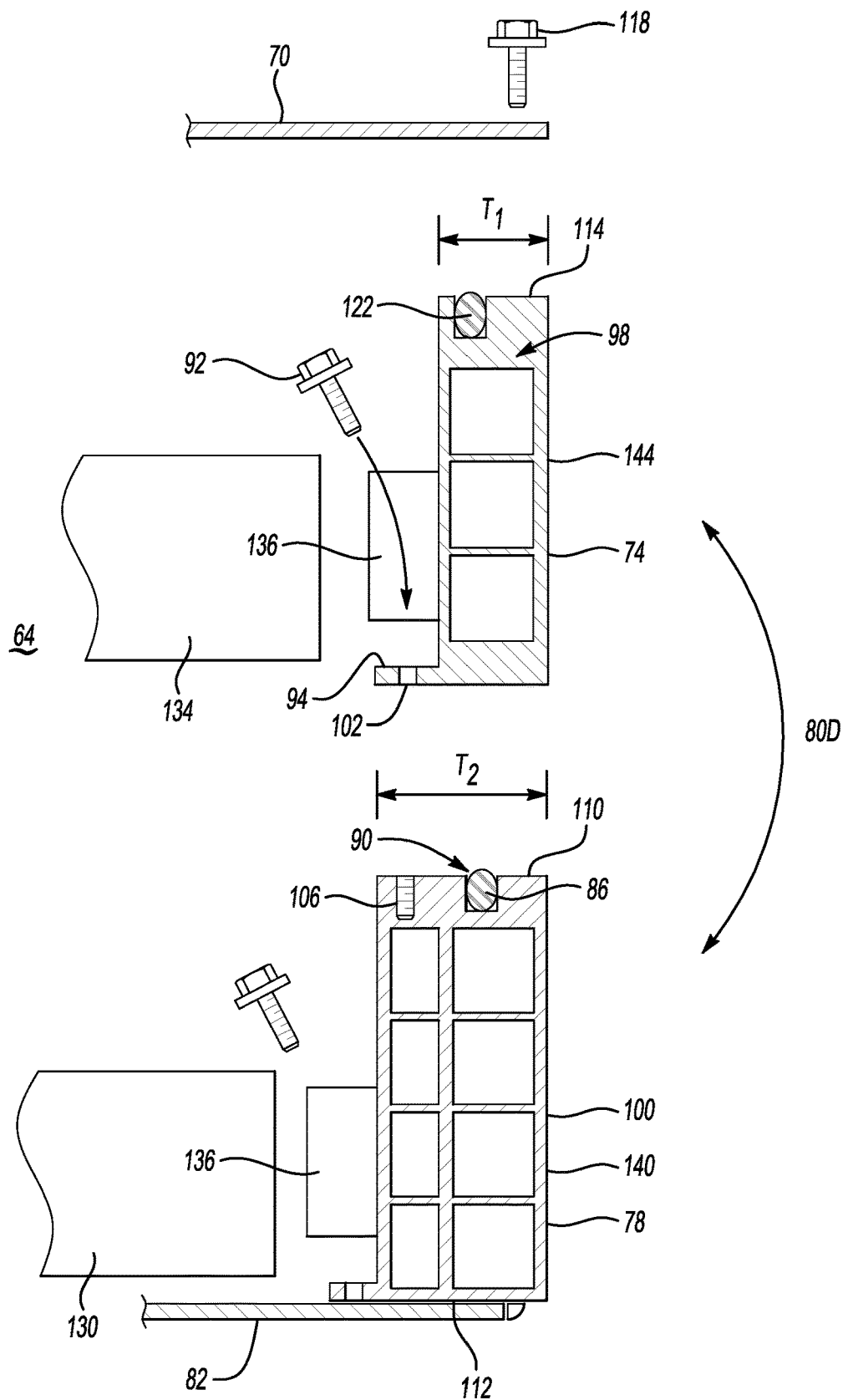
FIG. 4 illustrates a section view taken at line 4-4 in FIG. 3 prior to securing the lower sidewall section to an upper sidewall section.
Figure 5:
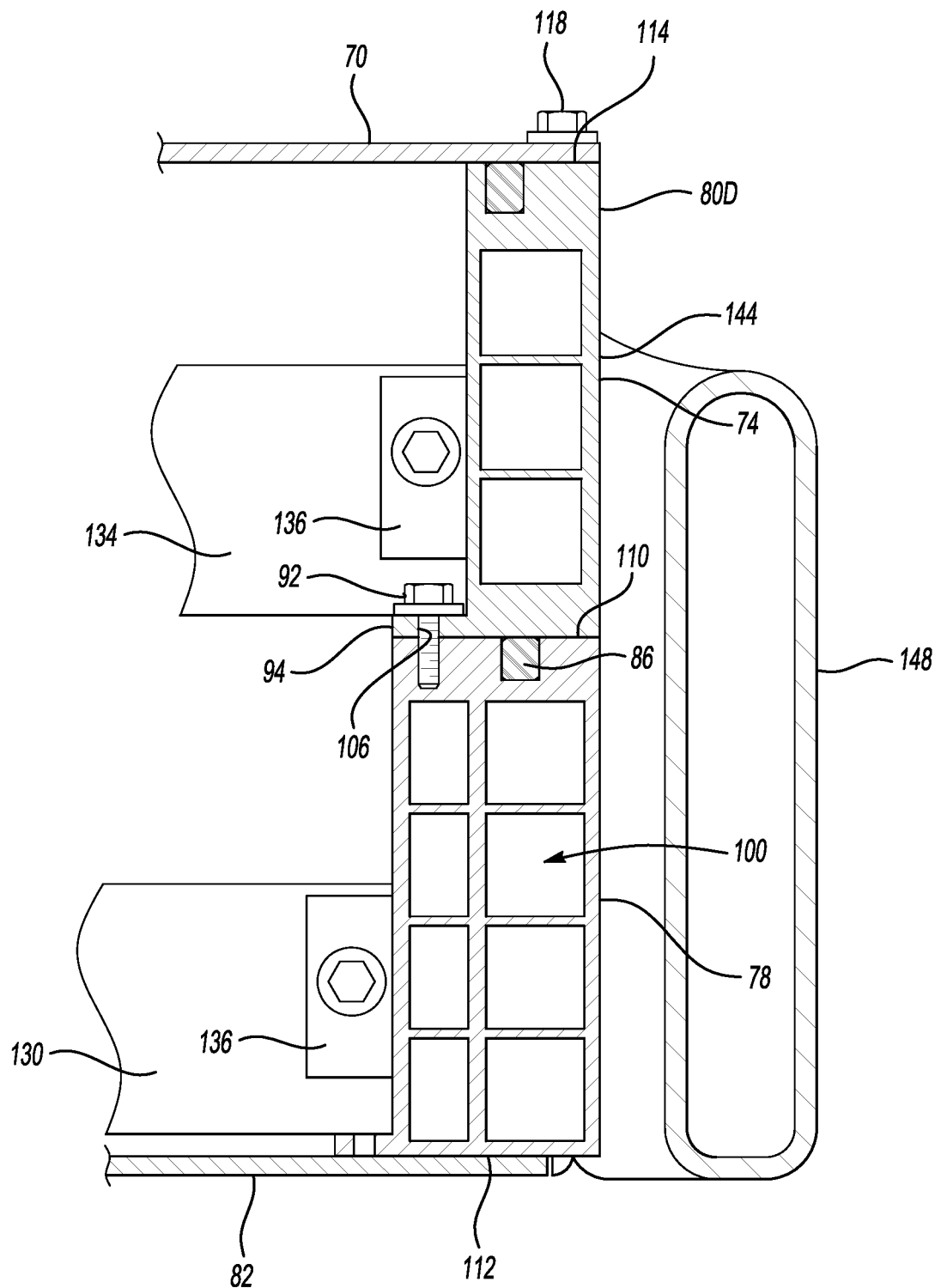
FIG. 5 illustrates the section view of FIG. 4 when the lower sidewall section and the upper sidewall section are secured together.

With reference now to FIGS. 3 to 5, fasteners 92 secure the upper sidewall sections 74 to the corresponding lower sidewall sections 78. The fasteners 92 are accessible from within the interior area 64. The fasteners 92 are inside the seal 86 and are bounded by the seal 86.

In this example, the upper sidewall section 74 includes an attachment flange 94 and a primary section 98. The attachment flange 94 projects inwardly away from the primary section 98 toward the interior area 64.

The primary section 98 has a thickness $T_1$. A primary section 100 of the lower sidewall section 78 has a thickness $T_2$. The thickness T1 is less than the thickness $T_2$. In other examples, a thickness of the lower sidewall section 78 would be the same as a thickness of the upper sidewall section 74. Fasteners, such as "U" nuts, "J" nuts, or "W" clips, could then be used to join the sections having similar thicknesses.

The fasteners 92 each extend through an aperture 102 of the attachment flange 94 into a bore 106 that opens to an uppermost, upwardly facing surface 110 of the lower sidewall section 78. The example fastener 92 is received within the bore 106 and threadably engages the lower sidewall section 78. The fastener 92 can be torqued down to clamp the attachment flange 94 of the upper side wall section 74 against the upwardly facing surface 110 of the lower sidewall section 78. Notably, the fastener 92 can be torqued down from within the interior area 64.

When torqued, the fastener 92 secures together the upper sidewall section 74 and the lower sidewall section 78 in a secured position. When in the secured position, the upper sidewall section 74 and the lower sidewall section 78 provide the sidewall assembly 80D.

In another example, the upper sidewall section 74 does not include an attachment flange 94. Instead, to secure the upper sidewall section 74 to the lower sidewall section 78, a fastener, such as a through bolt, can extend through a bore in the upper sidewall section to engage the lower side wall section 74. The through bolt could additionally extend through the cover 70, in some examples. In such examples, the through bolt can be located outside of the perimeter seals 122 and 86 in the wet areas or wet zone. When the through bolt is used, the thicknesses $T_1$ and $T_2$ may be the same.

The tray 82 can be secured to a downward facing surface 112 of the lower sidewall sections 78. The tray 82 can be welded to the lower sidewall sections 78, for example. The weld can seal an interface between the tray 82 and the lower sidewall sections 78, a separate thin sealer could be used as a seal. Alternatively, the tray 82 could be joined using threaded fasteners or adhesives. The tray 82 spans from the lower sidewall section 78 on the passenger side to the lower sidewall section 78 on the driver side.

The lid 70 can be secured to an upwardly facing surface 114 of the upper sidewall sections 74 utilizing, for example, a mechanical fastener 118. The lid 70 spans from the upper sidewall section 74 on the driver side to the upper sidewall section 74 on the opposing side. In this example, another seal 122 is utilized to seal an interface between the lid 70 and the upwardly facing surface 114 of the upper sidewall section 74.

Within the interior area 64, lower tier crossmembers 130 spans from the lower sidewall section 78 on the passenger side to the lower sidewall section 78 on the driver side. Upper tier crossmembers 134 span from the upper sidewall section 84 on the passenger side to the lower sidewall section 78 on the driver side. The crossmembers 130, 134 extend longitudinally in a cross-vehicle direction. Brackets 136 can be used to connect the crossmembers 130, 134 to the respective upper sidewall section 74 or lower sidewall section 78. A coldplate (not shown) can be sandwiched between the crossmembers 130 and the tray 82. In some examples, especially examples with smaller battery packs, crossmembers may not be used.

The upper tier crossmembers 134 help to support, among other things, the second tier of battery arrays 60. A longitudinal length of the upper tier crossmembers 134 is greater than a longitudinal length of the lower tier crossmembers 130. In particular, the upper tier crossmembers 134 extend further outboard than the crossmembers 130 on both the passenger side and the driver side. In this example, the upper tier crossmembers 134 extend over a portion of the upwardly facing surface 110. In some examples, the upper tier crossmembers 134 rest on the upwardly facing surfaces 110 of the lower sidewall sections 78. In other examples, the upper tier crossmembers 134 rest on the attachment flange 94. The upper tier crossmembers 134 can be permanently or removably joined to the upper sidewall sections 74. The lower tier crossmembers 130 can be permanently or removably joined to the lower sidewall sections 78.

The lower sidewall sections 78 each have an outwardly facing surface 140 that is planar and faces horizontally away from a centerline of the electrified vehicle. The upper sidewall sections 74 each have an outwardly facing surface 144 that is planar and faces horizontally away from a centerline of the electrified vehicle. The surfaces 140 and 144 are coplanar and together provide a relatively flat, structural outwardly facing surface for the sidewall assembly 80D of the enclosure assembly 62.

In contrast to the inner surfaces that face the centerline of the electrified vehicle, the outwardly facing surfaces 140, 144 are flangeless in the exemplary embodiment. In other examples, the lower sidewall section 78 has an integrated flange that extends outward from a vertical bottom area of the lower sidewall section 78. This integrated flange can be used for retention of the battery pack 24 to the vehicle. This positioning of the integrated flange would facilitate installation of the battery pack 24 from underneath the vehicle. Conversely, if the battery pack 24 were installed and retained from above, it may be appropriate to have such an integrated retention flange at the top portion of the top sidewall section 74.

The battery pack 24 can be mounted to an underbody of the electrified vehicle between a first frame member 148 on a driver side and a second frame member on a passenger side. The frame members are parts of a vehicle frame. The frame members can be side rails. In some examples, the lower sidewall section 78 could have a flange that projects outward beneath the associated rail. The battery pack 24 can be secured to the rail through that outwardly projecting flange.

The surfaces 140 and 144 facing outward on the driver side interface directly with the frame member 148. When a loading event occurs cause a load to be applied to the driver side of the electrified vehicle, the frame member 148 may move relative to the upper sidewall section 74 and the lower sidewall section 78, and can directly contact the outwardly facing surfaces 140 and 144. The loading event can be due to another vehicle contacting the driver side.

As the frame member 148 is loaded and contacts the outwardly facing surfaces 140 and 144, energy can be dissipated into the upper sidewall section 74, the lower sidewall section 78. As required, the load can pass through the upper sidewall section 74 and the lower sidewall section 78 into the crossmembers 130 and 134. The load can pass through the crossmembers 130, 134 to the upper sidewall section 74 and the lower sidewall section 78 on the passenger side of the battery pack 24. The load that has moved through the crossmembers 130, 134 is transferred around internal components of the battery pack 24, which can help to preserve the integrity of these components.

Features of the disclosed examples can include an enclosure sidewall assembly that is substantially structurally capable over its entire height and length. The sidewall assembly provides a flat or planar interface for distribution of loads received from an outboard vehicle structure (e.g. frame rail). The sidewall assembly promotes early structural engagement with loads which can provide more energy management options. The enclosure having the sidewall assemblies can readily accommodate one or multiple battery array tiers in the design, manufacturing, and assembly. The embodiments of this disclosure are scalable for different lengths, heights, widths of battery array tiers, and may accommodate a single tier, two tier, or more than two tiers as may be needed in a given design.

The preceding description is exemplary rather than limiting in nature. Variations and modifications to the disclosed examples may become apparent to those skilled in the art that do not necessarily depart from the essence of this disclosure. Thus, the scope of protection given to this disclosure can only be determined by studying the following claims.

What is claimed is:

1. A battery assembly for an electrified vehicle, comprising:
    an upper sidewall section of an enclosure;
    a lower sidewall section of the enclosure;
    a fastener that moves to a secured position to secure the upper sidewall section to the lower sidewall section, the fastener configured to be moved to the secured position from within an interior area of the enclosure; and
    a seal held between the upper sidewall section and the lower sidewall section at a position outside the fastener relative to an interior area of the enclosure.

2. The assembly of claim 1, wherein the upper sidewall section is an extruded upper sidewall section and the lower sidewall section is an extruded lower sidewall section.

3. The assembly of claim 1, further comprising at least one array of battery cells disposed within the interior area.

4. The assembly of claim 1, wherein an outwardly facing surface of the upper sidewall section is planar, and an outwardly facing surface of the lower sidewall section is planar.

5. The assembly of claim 4, wherein the outwardly facing surfaces of the upper sidewall section and the lower sidewall section are coplanar.

6. The assembly of claim 1, wherein an outwardly facing surface of the upper sidewall section is flangeless and an outwardly facing surface of the lower sidewall section is flangeless.

7. The assembly of claim 1, wherein an outwardly facing surface of the upper sidewall section and an outwardly facing surface of the lower sidewall section face a frame member of the electrified vehicle.

8. The assembly of claim 1, wherein the upper sidewall section rests on an upwardly facing surface of the lower sidewall section when the upper sidewall section is secured to the lower sidewall section.

9. The assembly of claim 1, wherein the upper sidewall section includes an attachment flange projecting toward the interior area from a primary section of the upper sidewall section.

10. The assembly of claim 9, wherein a thickness of the primary section of the upper sidewall section is less than a thickness of a primary section of the lower sidewall section.

11. The assembly of claim 9, wherein the fastener extends through an aperture in the attachment flange to engage the lower sidewall section when the upper sidewall section is secured to the lower sidewall section.

12. The assembly of claim 11, wherein the fastener threadably engages the lower sidewall section.

13. The assembly of claim 1, further comprising an upper tier crossmember that extends outboard over at least a portion of the lower sidewall section.

14. The assembly of claim 13, further comprising a lower tier crossmember, wherein a longitudinal length of the upper tier crossmember is greater than a longitudinal length of the lower tier crossmember.

15. The assembly of claim 1, further comprising a lid secured directly to the upper sidewall section and a tray secured directly to the lower sidewall section.

16. The assembly of claim 15, wherein the lid spans from the upper sidewall section to another upper sidewall section on an opposing side of the enclosure, wherein the tray spans from the lower sidewall section to another lower sidewall section on an opposite, second side of the enclosure.

17. An enclosure securing method, comprising:
    from an interior area of a battery pack enclosure, moving a fastener to a secured position; securing an upper sidewall section to a lower sidewall section using the fastener in the secured position; and
    sealing an interface between the upper sidewall section and the lower sidewall section at a position that is outside the fastener relative to the interior area.

18. The enclosure securing method of claim 17, wherein an outwardly facing surface of the upper sidewall section is planar, and an outwardly facing surface of the lower sidewall section is planar.

19. A battery assembly for an electrified vehicle, comprising:
    an upper sidewall section of an enclosure;
    a lower sidewall section of the enclosure;
    a fastener that moves to a secured position to secure the upper sidewall section to the lower sidewall section, the fastener configured to be moved to the secured position from within an interior area of the enclosure; and
    a seal held between the upper sidewall section and the lower sidewall section at a position outside the fastener relative to an interior area of the enclosure,
    wherein the upper sidewall section includes an attachment flange projecting toward the interior area, the fastener extending through an aperture in the attachment flange to secure the upper sidewall section to the lower sidewall section.

* * * * *